(12) United States Patent
Mason (10) Patent No.: US 10,316,965 B2
(45) Date of Patent: Jun. 11, 2019

(54) METHODS AND SYSTEMS FOR TORQUE CONVERTER CLUTCH CONTROL AND DYNAMIC SHIFT CONTROL METERING

(71) Applicant: Superior Transmission Parts, Inc., Tallahassee, FL (US)

(72) Inventor: Dean Mason, Tallahassee, FL (US)

(73) Assignee: SUPERIOR TRANSMISSION PARTS, INC., Tallahassee, FL (US)

(*) Notice: Subject to any disclaimer, the term of this patent is extended or adjusted under 35 U.S.C. 154(b) by 0 days.

(21) Appl. No.: 15/603,439

(22) Filed: May 23, 2017

(65) Prior Publication Data

US 2017/0335956 A1  Nov. 23, 2017

Related U.S. Application Data

(60) Provisional application No. 62/340,123, filed on May 23, 2016.

(51) Int. Cl.
| | |
|---|---|
| *F16H 61/14* | (2006.01) |
| *F16H 45/02* | (2006.01) |
| *F16D 25/12* | (2006.01) |
| *F16K 11/07* | (2006.01) |
| *F16K 31/06* | (2006.01) |

(52) U.S. Cl.
CPC ........... *F16H 61/143* (2013.01); *F16D 25/12* (2013.01); *F16H 45/02* (2013.01); *F16K 11/07* (2013.01); *F16H 2045/0215* (2013.01); *F16K 31/0613* (2013.01)

(58) Field of Classification Search
CPC ........... F16H 61/143; F16H 2045/0215; F16H 45/02; F16H 61/14; F16D 25/12; F16K 11/07; F16K 31/0613
See application file for complete search history.

(56) References Cited

U.S. PATENT DOCUMENTS

| | | | | |
|---|---|---|---|---|
| 5,417,622 | A * | 5/1995 | Asayama | F16H 61/143 192/3.3 |
| 2012/0000740 | A1* | 1/2012 | Shimizu | F16H 61/143 192/3.3 |
| 2016/0252178 | A1* | 9/2016 | Dial | F16H 61/0276 137/15.17 |
| 2017/0219091 | A1* | 8/2017 | Dial | F16H 61/0009 |

* cited by examiner

*Primary Examiner* — Huan Le (57) ABSTRACT

The present invention provides a method and system of modifying a torque converter clutch control system having a hydraulic circuit including a solenoid signal line, a torque converter IN line, a torque converter OUT line, a lockup clutch apply line, and a supply presser line such that, in a valve body, a hole is drilled in a valve body to connect the solenoid signal line in a first area to a second differential area connected to the torque converter OUT line, and the torque converter OUT hole in the valve body casing is plugged.

12 Claims, 12 Drawing Sheets

TORQUE CONVERTER CLUTCH CONTROL VALVE

CASTING CONFIGURATION #1
CROSS-CONNECT CIRCUITS AS SHOW HERE
CAVITY 2

FIG. 10A

CASTING CONFIGURATION #2
CROSS-CONNECT CIRCUITS IN THE DIRECTION SHOWN BELOW AT THE SOLID ARROW
CAVITY 2

METHODS AND SYSTEMS FOR TORQUE CONVERTER CLUTCH CONTROL AND DYNAMIC SHIFT CONTROL METERING

CROSS-REFERENCE TO RELATED APPLICATIONS

This application claims the benefit of U.S. Provisional Patent Application No. 62/340,123 filed on May 23, 2016, the content of which is incorporated herein by reference.

FIELD OF THE INVENTION

Embodiments of the present invention related to systems and methods for controlling automobile transmissions. Particularly, embodiments of the present invention relate to torque converter clutch (TCC) control and orifice-to-orifice shift control metering.

BACKGROUND

Flex lockup strategies currently employed by auto manufacturers, with intent toward more finely controlled engine RPM and fuel consumption, may provide a marginal improvement. However, this only holds true in new vehicles with system components operating at optimum and under ideal conditions. As systems begin to age the lockup function degrades rapidly resulting the following excess torque converter slip, torque converter clutch "shudder" (torsional vibration generated by slip-grab-slip-grab), excess heat generated in the torque converter, premature failure of the lockup clutch, premature failure of the ATF, and/or, diagnostic trouble codes set (the slip RPM being too high for too long during the flex duty cycle). Many of these symptoms or malfunction are experienced after repair with a remanufactured torque converter (TC) and rebuilt transmission.

Figure 1:
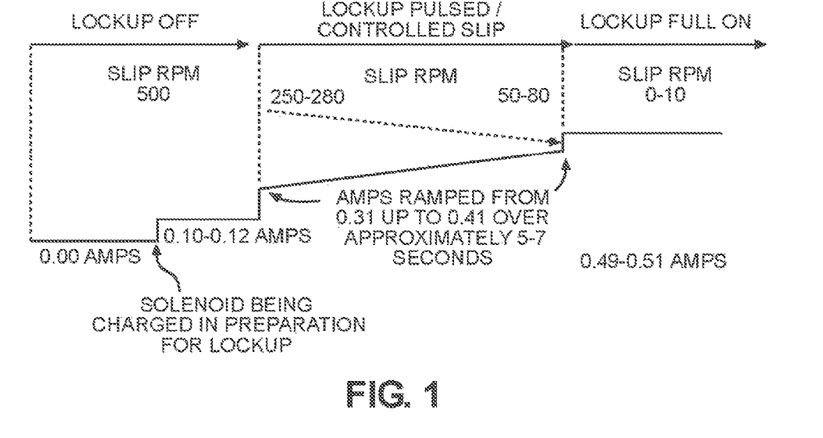
FIG. 1 illustrates the electronic operation of a conventional torque converter clutch (TCC) control solenoid.

With reference to FIG. 1, the diagram illustrates the conventional electronic control of the torque converter clutch (TCC) solenoid during operation, and the corresponding lockup clutch controlled slip RPM during the application cycle. The long gradual apply of the "flex" lockup makes TCC application nearly undetectable by most without a scan device. At lockup off, the slip RPM is 500 and the TCC solenoid is increased from 0 amps to 0.10 to 0.12 amps as the solenoid is being charged in preparation for lockup. At the beginning of the lockup pulsed/controlled slip phase, the solenoid signal is increased to approximately 0.31 amps. During this phase, the slip RPM decreases from 250-280 RPM to 50-80 RPM as the solenoid signal is ramped from 0.31 up to 0.41 amps over approximately 5-7 seconds. At the beginning of the lock up full on phase, the solenoid signal is increased to 0.49 to 0.51 amps and the slip RPM decreases to 0-10 RPM.

Figure 5:
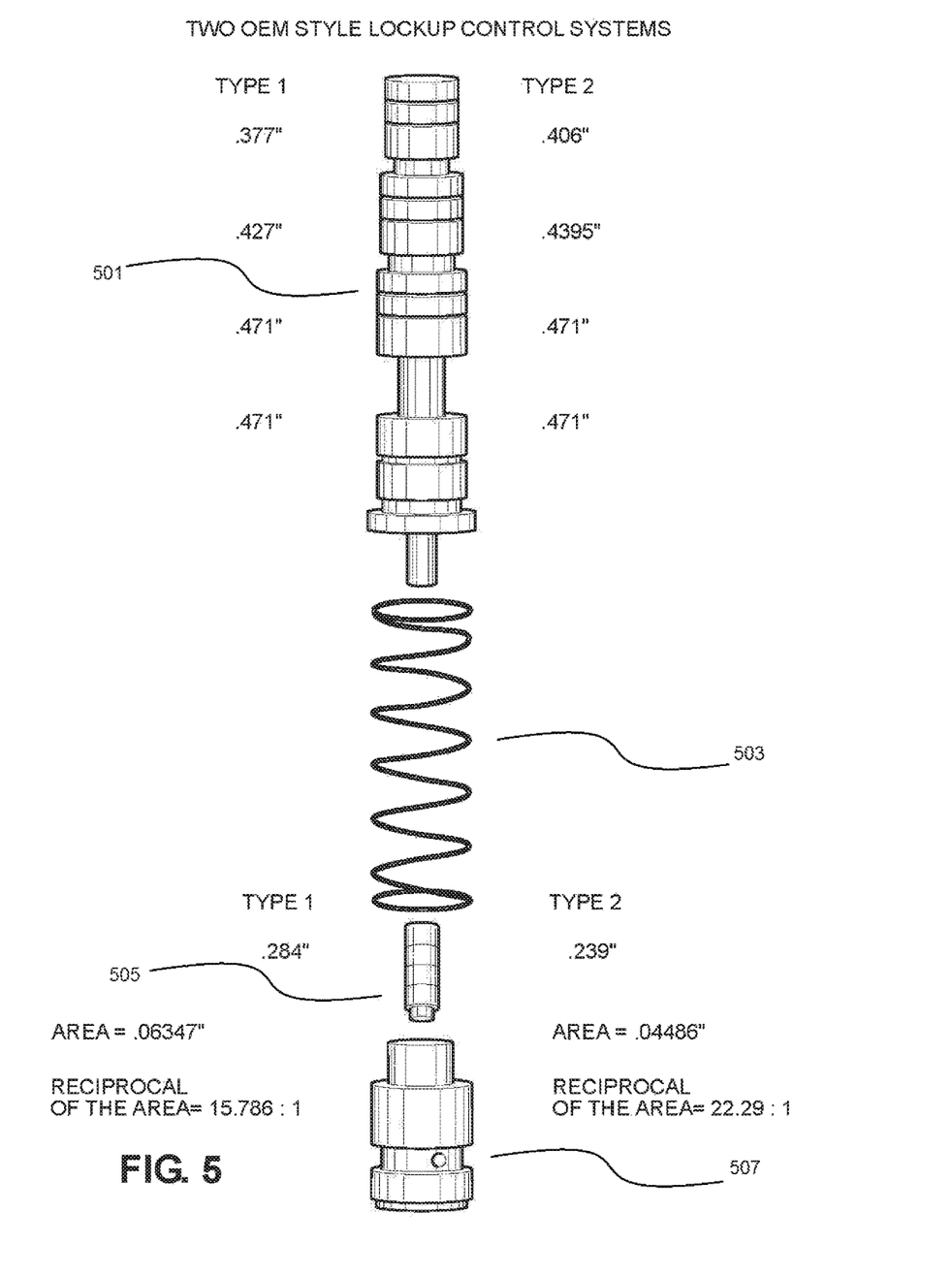
FIG. 5 illustrates two types of lockup control valves and corresponding pre-fill valves, consistent with the present invention.

With reference to two conventional lockup control systems in FIG. 5, the type 2 pre-fill valve area reciprocal is 22.29 (1/0.04486"). Therefore, with a factory spring tension of 3.375 lb.×22.29=75.23 psi internal TC pressure required to overcome the spring to pre-fill the lockup clutch apply circuit with no solenoid signal applied to the valve. The TC pressure typically runs 10-25 psi below line pressure supply when pressure is below the TC feed limit of 127 psi. Thus, line pressure supply must exceed around 90 psi (25% of the boost range) in order to pre-fill. However, when line pressure specifications are compared and show that the idle line pressure is 54-61 psi, and if line happens to be running on the low side of this specification, it is possible that to have insufficient downward force on the valve to pre-fill the circuit, even with solenoid signal applied at approximately 20% duty cycle during the solenoid charging phase (see FIG. 1) which is intended as the pre-fill cycle. Thus, when lockup is commanded ON, there is a time delay and lower-than-expected TCC apply pressure. This state can occur, e.g., at low RPM cruise with minimal load (relatively low line pressure and low TCC internal psi resulting in reduced pump volume output).

SUMMARY

In view of the foregoing, it is an object of the present invention to correct and prevent TCC slip, shudder, and premature failure. Further, it is an object of the present invention to provide increased TCC durability, increased TCC life, increased TCC holding capacity and torque transfer, especially at higher load conditions, increased transmission fluid life with reduced heat generation and lower average operating temperatures, and a reduced impact on global warming.

DETAILED DESCRIPTION

Most of the heat of the transmission assembly is generated inside the torque converter during stall and torque multiplication, so a constant flow of cooled fluid must be supplied via the TCC IN fluid circuit, while the TCC OUT fluid circuit is then directed to the vehicle radiator to be cooled again. The TCC control valve (or converter pressure limit valve) limits converter feed pressure to a maximum of approximately 127 psi. The TCC IN should never be higher than line pressure supply, so below this limit (i.e., when main line pressure is between 70-127 psi) TCC OUT psi is equal or slightly less than the line pressure supply.

Figure 4:
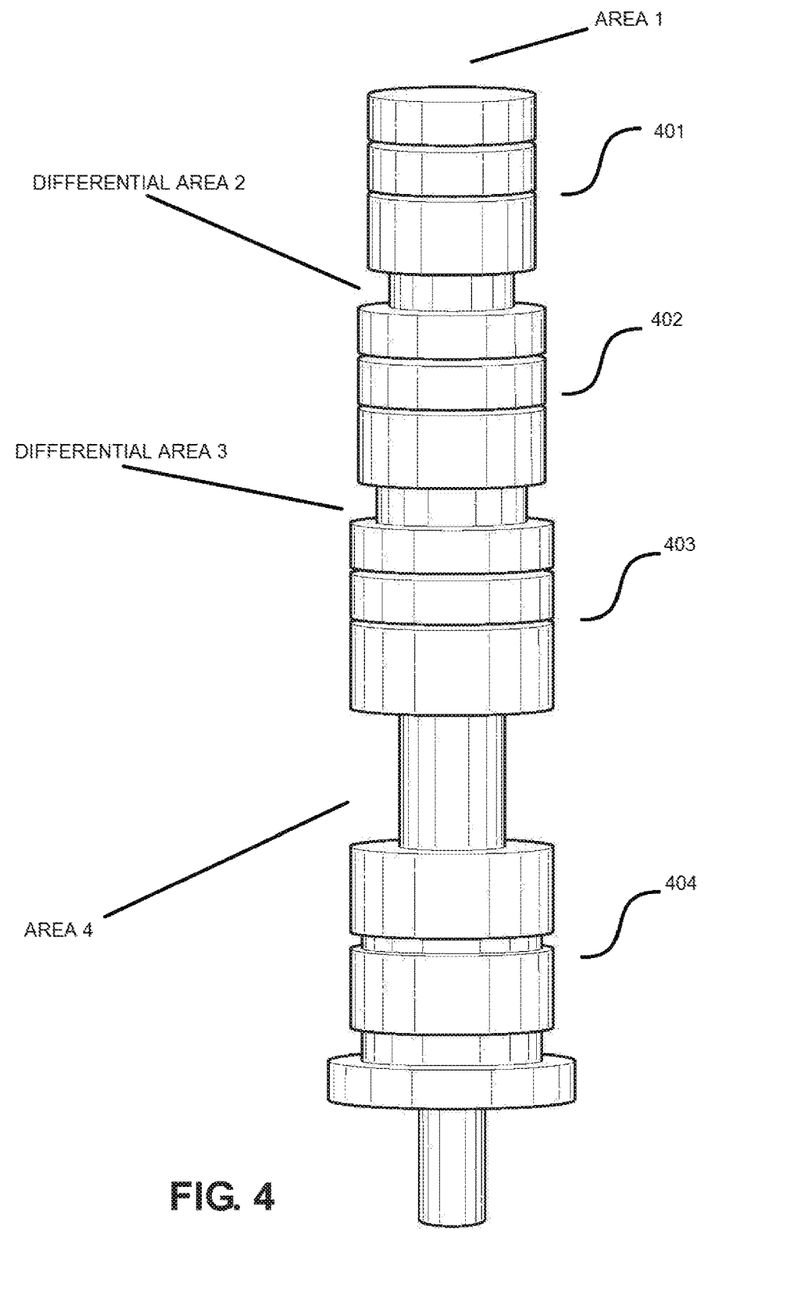
FIG. 4 is an exploded view of the TCC control valve the hydraulic circuit diagram of FIG. 3.

On the output side of the system, cooler pressure is limited to a maximum of 103 psi, so internal converter pressure is intended to not exceed 110-120 psi. Converter OUT psi depends on several variables such as engine RPM and pump volume output, TCC IN pressure, resistance of the cooler system, etc., but suffice it to say it will generally be slightly lower than TCC IN psi (roughly 60-80% depending on operating conditions). Since actual internal converter pressure will be the average of these two values (TCC IN vs. TCC OUT), conventional systems provide a sampling of both circuits at the TCC control valve. With reference to FIG. 4, differential areas 2 and 3 are equal in size. That is to say, the area difference between lands 1 and 3 is split 50/50 by land 2. Thus, the continual downward force acting on the control valve via these areas is proportional to the internal converter pressure times the combined differential areas.

In order to maintain accurate control of lockup clutch apply, the lockup clutch apply circuit must remain fully primed even when the torque converter clutch is released. If the circuit was permitted to drain down, when the clutch is commanded on there would result a time delay while the circuit is primed and all air purged from the system. Because the vehicle computer monitors all commands and RPM changes, and converter slip RPM, the delay would be registered as a fault (malfunction) and diagnostic trouble codes in the vehicle computer would be set.

Figure 3:
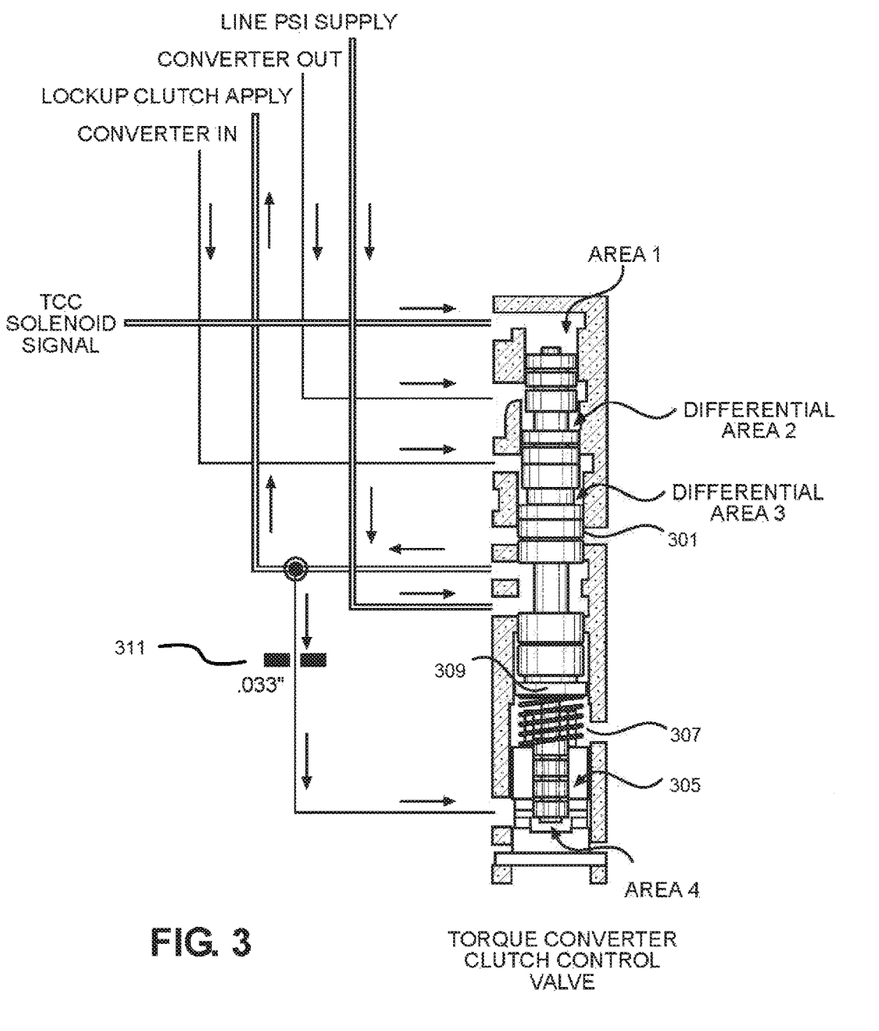
FIG. 3 illustrates conventional TCC control valve hydraulic circuit.

FIG. 3 illustrates conventional TCC control valve hydraulic circuit. FIG. 4 is an exploded view of the TCC control valve the hydraulic circuit diagram of FIG. 3. With reference to FIGS. 3 and 4, lockup control valve 301 engages lockup prefill regulator 305, which regulates the "prime" or "prefill" pressure. AREA 1 receives the TCC solenoid signal. AREA 4 corresponding to the lockup pre-fill regulator 305 is equal to the sum of differential AREA 2 and differential AREA 3. That is, the lockup pre-fill regulator 305 provides a counter-balance force of equal area. Spring 307 is held in place by a stationary pre-fill valve bushing 303, and pushes upward on flats 309. Therefore, the difference between internal converter pressure and pre-fill pressure is determined by spring 307, and is expressed as spring tension divided by AREA 4, or inversely as spring tension multiplied by the reciprocal of the area. Orifice(s) 311 is conventionally configured to be 0.033" in diameter and allows and allows the lockup clutch pre-fill regulator circuit to pass to AREA 4.

Still referencing FIGS. 3 and 4, the TCC solenoid signal applied to AREA 1 above lockup control valve 301. TC OUT corresponds to differential AREA 2 between land 401 having a first diameter and land 402, land 402 having a second diameter. TCC IN corresponds to differential AREA 3 between land 402 and land 403, land 403 having a third diameter. Line pressure supply in and lockup clutch apply out are provided and returned between land 403 and land 404, having a fourth diameter. This regulated output is supplied to the lockup clutch apply piston in the TC and to the lockup clutch pre-fill regulator 305.

With reference to FIG. 5, two types of lockup control valves and corresponding pre-fill valves in the valve body are illustrated with their dimensions. In the type 1 lockup control valve, land 401 has a diameter of 0.377", land 402 has a diameter of 0.427", land 403 has a diameter of 0.471", land 404 has a diameter of 0.471", and pre-fill regulator has a diameter of 0.284". Thus the area corresponding to the diameter of the type 1 pre-fill regulator is 0.06347". In the type 2 lockup control valve, land 401 has a diameter of 0.406", land 402 has a diameter of 0.4395", land 403 has a diameter of 0.471", land 404 has a diameter of 0.471", and pre-fill regulator has a diameter of 0.239". Thus the area corresponding to the diameter of the type 2 pre-fill regulator is 0.06347". They match according to corresponding areas (i.e., the sum of differential AREA 2 and differential AREA 3 is equal to AREA 4). Where a factory original spring 503 tension may be 3.375 lb., a type 1 system has an area reciprocal of 15.786 (1/0.06347"), thus 3.375 lb.× 15.786=53.27775 psi internal TC pressure. Therefore, if internal TC pressure is 60 psi, the pre-fill regulator will make 6-7 psi, which is adequate to prime the system.

Figure 6:
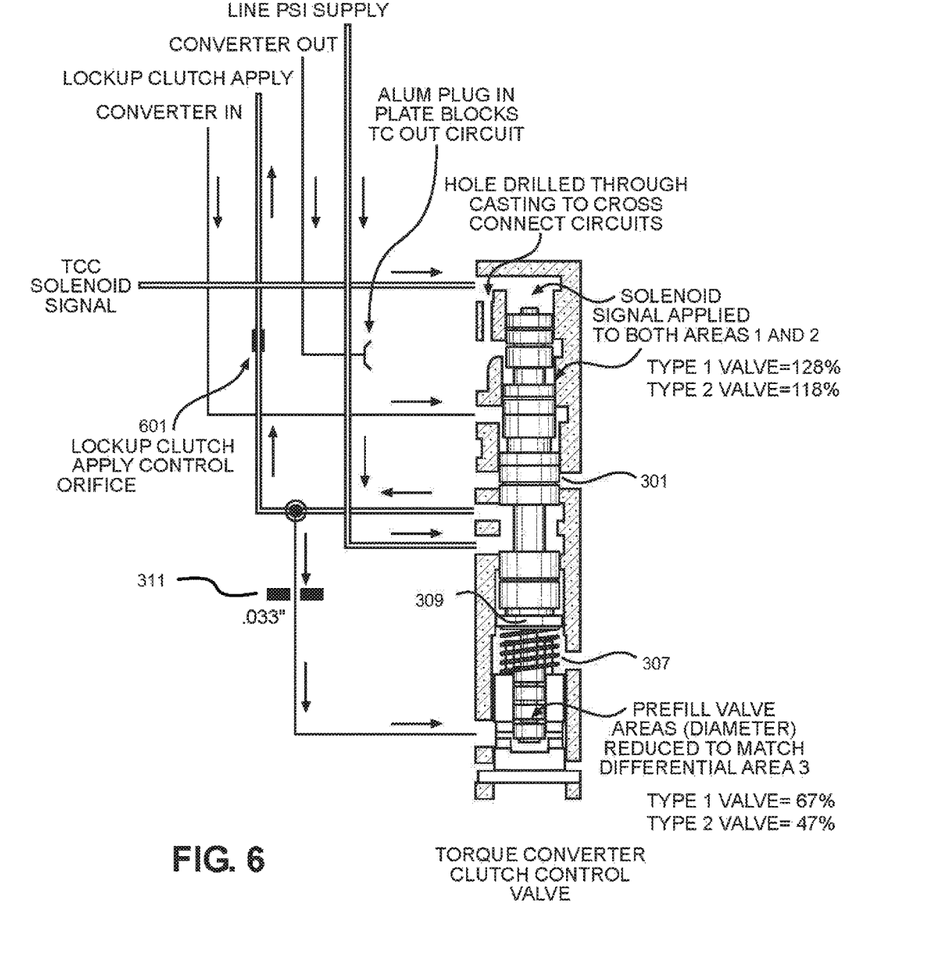
FIG. 6 illustrates a hydraulic circuit of an improved TCC control valve system consistent with the present invention.

FIG. 6 illustrates a hydraulic circuit of an improved TCC control valve system of the present invention. With reference to FIG. 4, like components in FIG. 6 are referenced with like numerals, the description of which is omitted for brevity. As shown FIG. 6, a hole is drilled in the casting between AREA 1 and differential AREA 2, cross-connecting these circuits. A plug is placed in the TC OUT passage of the spacer plate (see FIG. 8), thereby making CAVITY 2 (FIG. 9) and differential AREA 2 available for the TCC solenoid signal provided at AREA 1. When the valve body casting is drilled (FIGS. 10A and 10B) joining AREA 1 and differential AREA 2, the TCC solenoid signal is then made available to both in order to change the signal area ratio and thereby modify TCC apply pressure and rate.

Figure 10A:
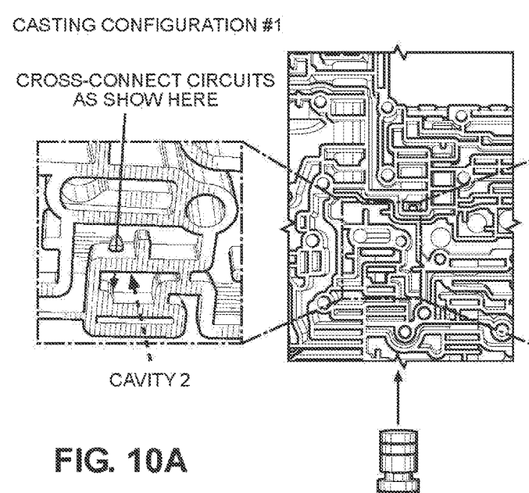
FIG. 10A illustrates a casting configuration in a valve body consistent with the present invention.
Figure 10B:
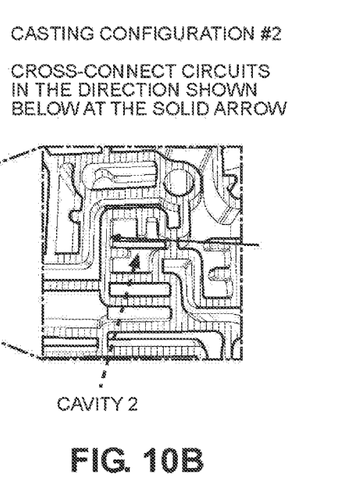
FIG. 10B illustrates another casting configuration in a valve body consistent with the present invention.

FIGS. 10A and 10B illustrate two different casting configurations in a valve body in which the cross-connecting of AREA 1 and differential AREA 2 can be made. Functionally there is no difference, it is merely a difference of casting configurations and the cross-connecting process remains the same.

In embodiments of the improved TCC control system of the present invention, the type 1 and type 2 pre-fill valves in FIG. 5 match their respective lockup control valves. The pre-fill valve diameters shown represent an area equal to the sum of differential AREA 2 and AREA 3, as described in FIG. 4. In the improved TCC control system of the present invention, only TCC IN pressure is sampled, and the new pre-fill regulator valve of the present invention is such that the diameter that represents a new area equal to that of differential AREA 3 alone. For a type 1 this diameter is 0.170" and type 2 it is 0.199". In embodiments of the improved TCC control system of the present invention, it has been found that, due to the difference of the type 1/type 2 area reciprocals, the 0.199" valve of the present invention provides an improvement in both types as a multi-fit. Considering that parts of this nature may be routinely made and surface ground to spec +/−0.0002", and must be made to fit with acceptable clearance in bushing 507 (FIG. 5), previous manufacturing solutions of replacement original equipment (OE) parts would not make the 0.239" OE valve smaller than 0.236" because of the restrictions of such implementation. However, in embodiments of the improved TCC control system of the present invention, the pre-fill valve has diameter of 0.235" or less. The alternate 2 land design valve has a differential area is also equal or less than that of a single diameter of 0.235", or an area equal or less than 0.043373613".

Component parts of a TCC upgrade system consistent with the present invention may include and oval aluminum plug (0.13 8"×0.315"), a 0.073" drill bit, a 0.093" drill bit a pressure regulator spring, a re-calibrated pre-fill valve and bushing, and re-calibrated lockup control valve spring (3 lb 2 oz @0.400" compressed height).

Figure 2:
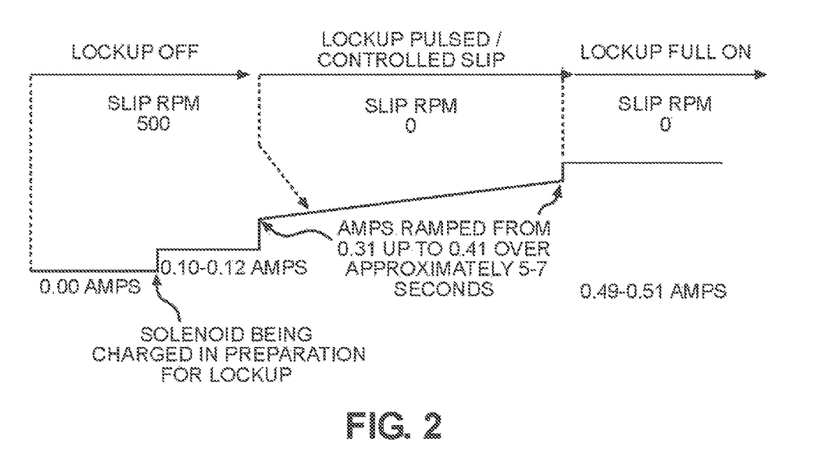
FIG. 2 illustrates the electronic operation of an improved torque converter clutch (TCC) control solenoid consistent with the present invention.

Referring to FIG. 2, the diagram illustrates the electronic control of the torque converter clutch (TCC) solenoid during operation with the improved TCC control system of the present invention, and the corresponding lockup clutch controlled slip RPM during the application cycle. At lockup off, the slip RPM is 500 and the TCC solenoid is increased from 0 amps to 0.10 to 0.12 amps as the solenoid is being charged in preparation for lockup. At the beginning of the lockup pulsed/controlled slip phase, the solenoid signal is increased to approximately 0.31 amps. During this phase, the slip RPM drops off to 0 RPM as the solenoid signal is ramped from 0.31 up to 0.41 amps over approximately 5-7 seconds. At the beginning of the lock up full on phase, the solenoid signal is increased to 0.49 to 0.51 amps and the slip RPM sustains 0 RPM.

In OE manufacturing specifications, the lockup clutch apply control orifice is typically 0.076". In embodiments of the improved TCC control system of the present invention shown in FIG. 6, the lockup clutch apply control 601 orifice is enlarged to be between 0.086" to 0.098" to achieve an improved TCC apply rate compared to other specifications. In some embodiments, the TCC apply rate may be optimized when the lockup clutch apply control orifice 0.093".

Figure 10C:
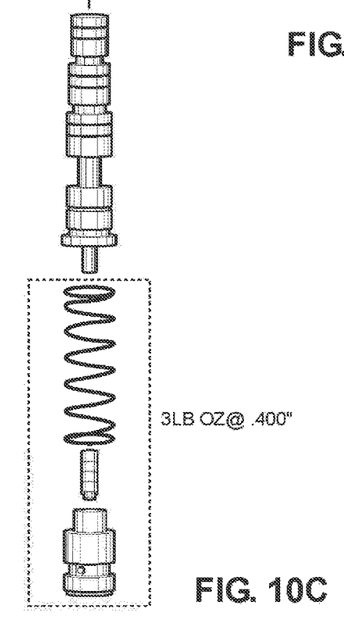
FIG. 10C illustrates a lockup control valve, pre-fill valve, spring, and bushing consistent with the present invention.

When working with a pre-fill valve regulator with a diameter of 0.195" to 0.199", a lockup control valve spring 507 with a working load of 3 lb., 2 oz. [+/−2 oz.] at a 0.400" compressed height (see FIG. 10c) is optimal with respect to electronic pulse width modulation (PWM) control of the TCC lockup clutch apply.

Figure 8:
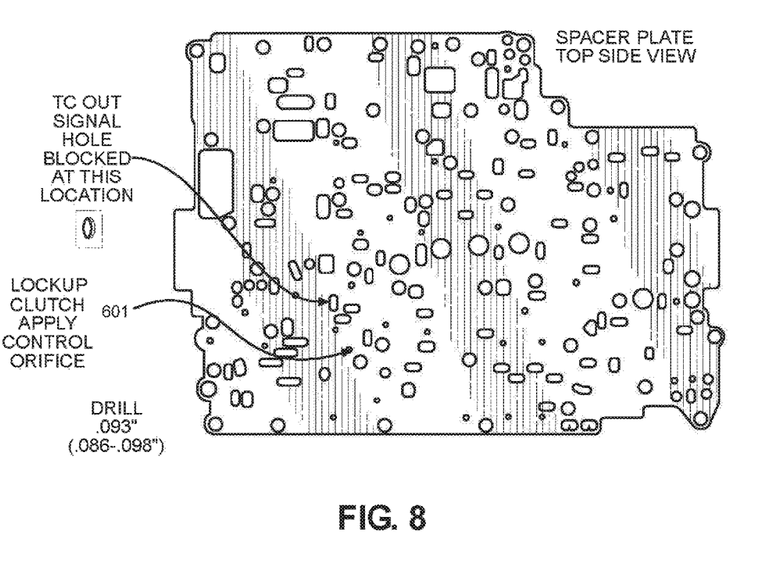
FIG. 8 illustrates a top side view of a space plate consistent with the present invention.

FIG. 8 illustrates a top side view of a valve body spacer plate consistent with the improved TCC system of the present invention. As shown, the TC OUT port is plugged, e.g., with an aluminum plug. The lockup clutch apply control orifice 601 is drilled out from the OE specification to between 0.086" to 0.098", and optimally to 0.093".

Figure 9:
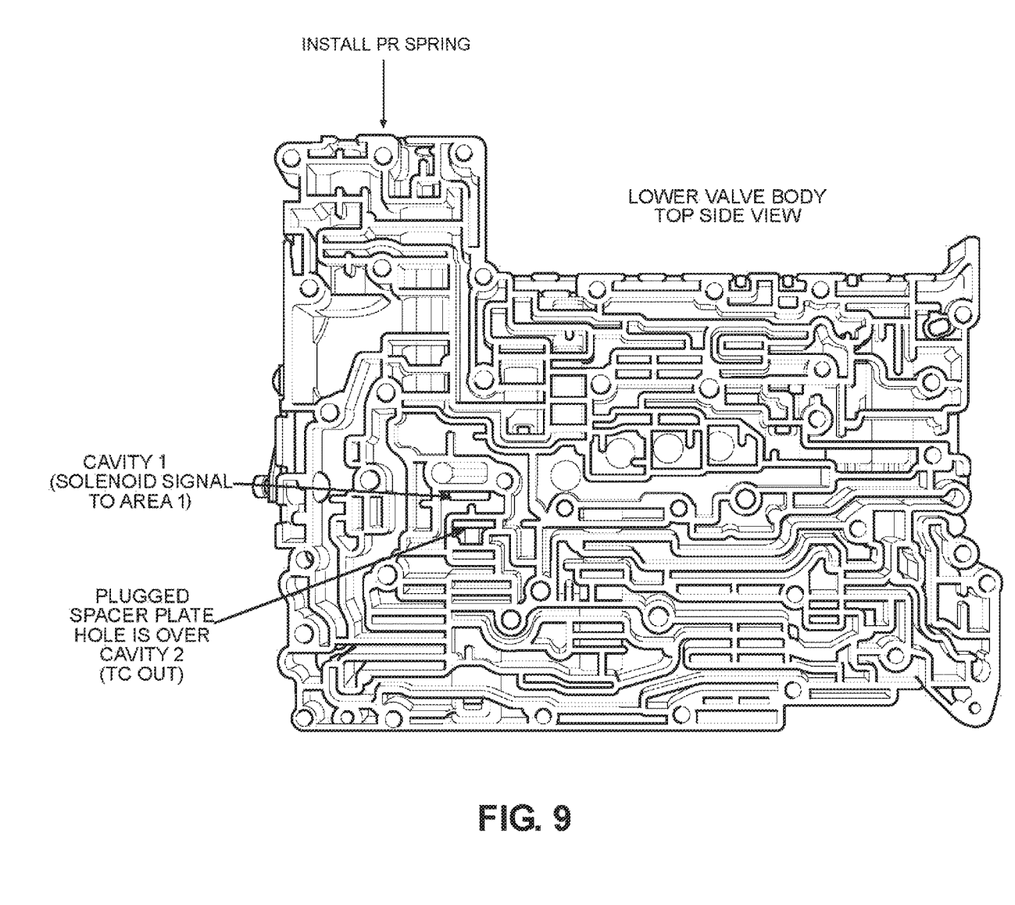
FIG. 9 illustrates a top side view of a lower valve body consistent with the present invention.

FIG. 9 illustrates a top side view of a lower valve consistent with the improved TCC system of the present invention. In FIG. 9, CAVITY 1 is a cavity providing the TCC solenoid signal to AREA 1. The spacer plate hole is plugged over CAVITY 2, corresponding to TC OUT. An install location of an upgraded pressure regulator (PR) spring is shown, consistent with the improved TCC system of the present invention.

Figure 11:
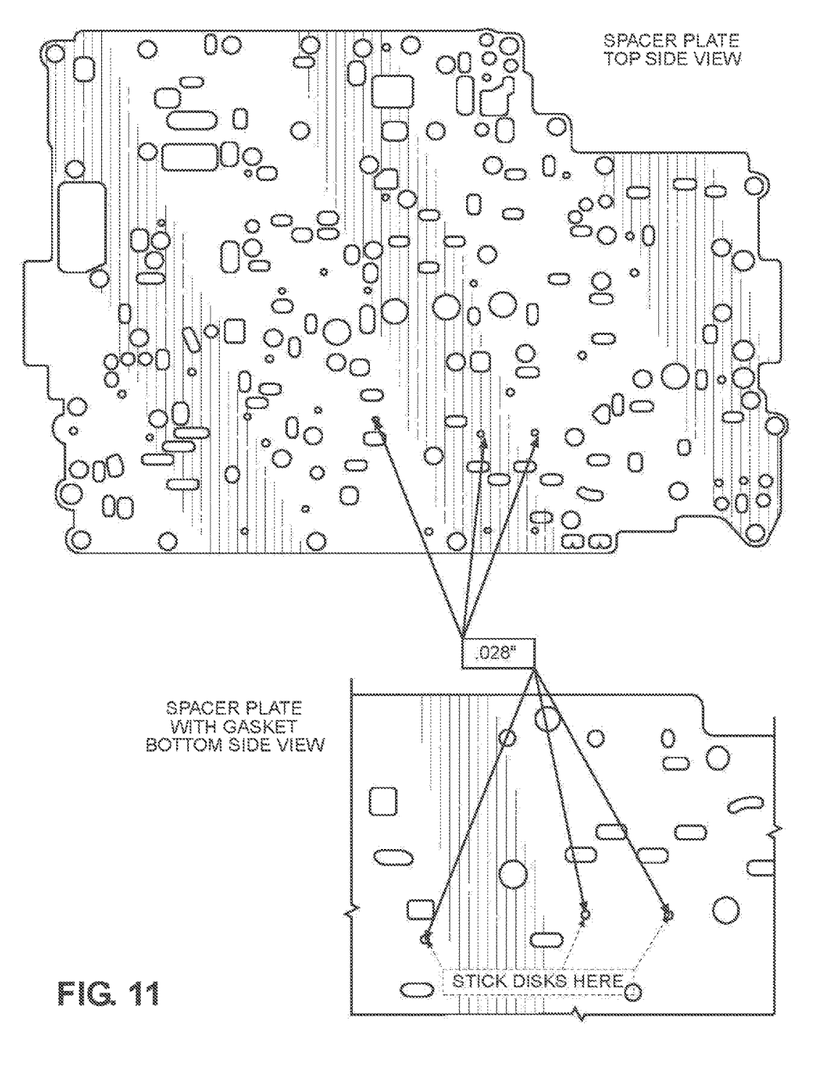
FIG. 11 illustrates a top side view of a spacer plate and corresponding bottom side view consistent with the present invention.

FIG. 11 illustrates a top side view of a spacer plate and corresponding bottom side view consistent with the present invention. In FIG. 11, three solenoid signal supply orifices for each shift control valve are shown. Each orifice, originally sized to 0.033", is reduced to 0.028".

Figure 12:
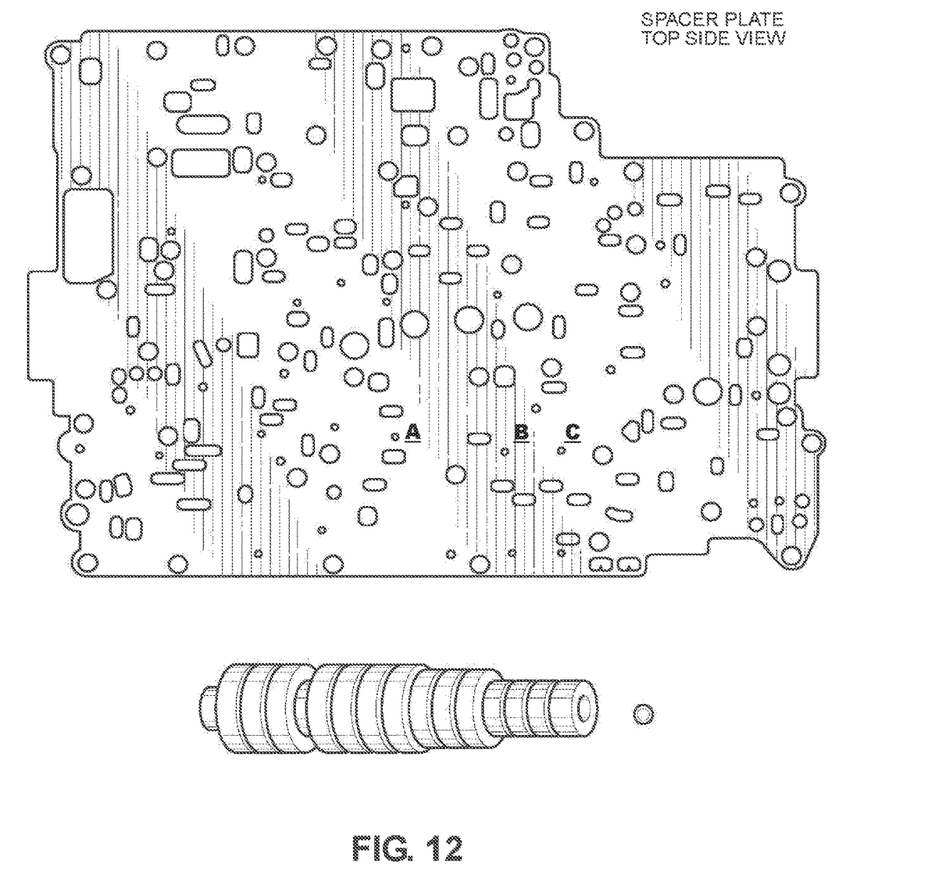
FIG. 12 illustrates a top side view of a space plate and corresponding shift control valve consistent with the present invention.

FIG. 12 illustrates a top side view of a space plate and corresponding shift control valve consistent with the present invention. There is one solenoid signal exhaust orifice in each shift control valve. There are no internal moving parts to the shift control valve, as it is a dynamic orifice-to-orifice metering system.

Figure 13:
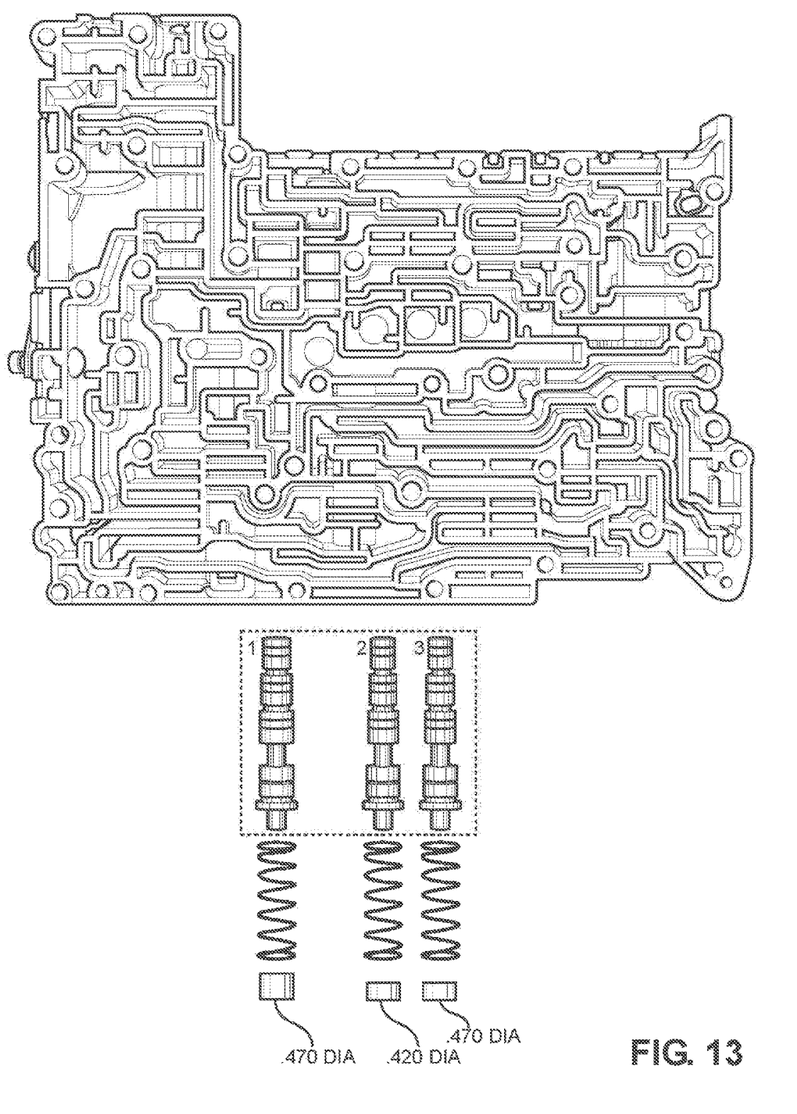
FIG. 13 illustrates a top side view of a lower valve body and three corresponding shift control valves.

FIG. 13 illustrates a top side view of a lower valve body and three corresponding shift control valves. Valves 1 and 3 are the same, whereas valve 2 and correspond spring and plug are smaller in diameter.

Figure 7A:
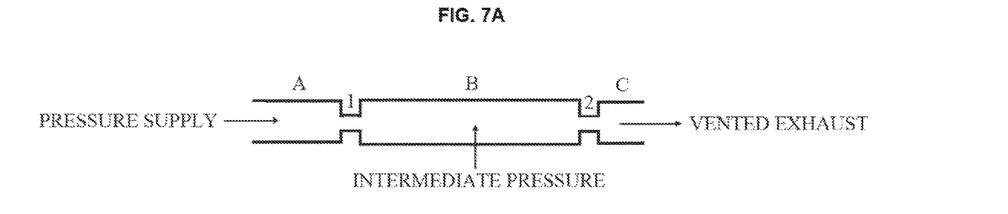
FIG. 7A illustrates in-series orifices consistent with an embodiment of the present invention.
Figure 7B:
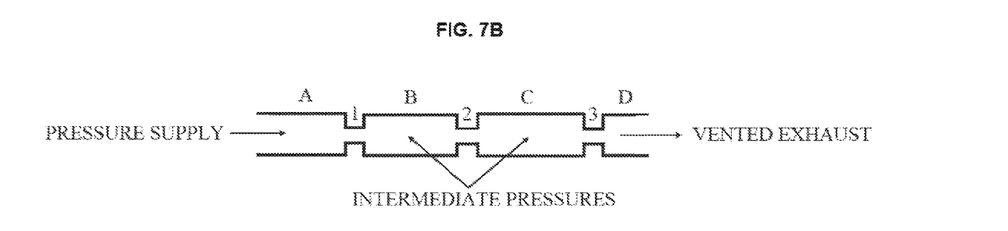
FIG. 7B illustrates in-series orifices consistent with another embodiment of the present invention.

FIGS. 7A and 7B illustrate in-series orifices for pressure regulation in shift control valves. In addition to solenoids and regulating valves which typically can raise or lower circuit pressures, in-series orifices can also provide hydraulic pressure regulation. FIG. 7A illustrates two orifices 1 and 2 in series. If it is assumed that both flow control orifices are of the same area (or same diameter hole), then if area C is vented (0 PSI), chamber B (between the two orifices) would contain a regulated intermediate pressure of 50% of the pressure supply. In other words, the pressure ratio would be 1:½:0. FIG. 7B illustrates three orifices 1, 2, and 3 in series. Again, if these flow control orifices are equal, then a pressure ratio of 1:⅔:⅓:0 would be expected. Thus, if the supply equals 300 psi, then B=200 psi, C=100 psi, and D=0 psi.

Note that, in FIG. 7A, pressure in chamber B is increased when either orifice 1 is enlarged or orifice 2 is reduced. Conversely pressure in chamber B is reduced when either orifice 1 is reduced or orifice 2 is enlarged. Thus, in-series orifices provide an advantage over a blow-off ball or valve. A blow-off (pressure relief) device has a static function. Whether it is a ball (or valve) and spring in a chamber, valve, or in a cavity with the ball held against a valve body spacer plate, the blow-off pressure is constant and is determined by the tension of the spring divided by the area to which pressure is applied. Supply pressure has no real effect on the blow-off psi value. It is static (or constant), being controlled by a spring. However, in-series orifices are dynamic, and chambered PSI will vary, as it is a function of supply pressure. It is therefore a very different engineering device from a blow-off/pressure relief system, with its own distinct application value.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of modifying a valve body to improve a torque converter clutch control system therein, the torque converter clutch control system having a hydraulic circuit including a solenoid signal line, a torque converter IN line, a torque converter OUT line, a lockup clutch apply line, and a supply pressure line, comprising:
   drilling a hole in the valve body to connect the solenoid signal line in a first area to a second differential area connected to the torque converter OUT line; and
   plugging a torque converter OUT hole in the valve body.

2. The method of claim 1, wherein the torque converter OUT line is no longer connected to the second differential area.

3. The method of claim 1, further comprising blocking a torque converter signal hole in a valve separator plate attachable to the valve body.

4. The method of claim 1, further comprising enlarging a lockup clutch apply control orifice in a valve separator plate attachable to the valve body.

5. The method of claim 4, wherein the lockup clutch apply control orifice is enlarged to a diameter between 0.086" to 0.098".

6. The method of claim 1, further comprising reducing three solenoid supply orifices in a valve spacer plate attachable to the valve body.

7. The method of claim 6, wherein the three solenoid supply orifices are reduced in diameter from 0.033" to 0.028".

8. The method of claim 1, further comprising installing a pressure regulator spring in the valve body.

9. The method of claim 1, further comprising installing a re-calibrated pre-fill valve and a corresponding bushing on an end of a torque converter clutch control valve installed within the valve body;
and installing a re-calibrated lockup control valve spring between the re-calibrated pre-fill valve and the torque converter clutch control valve.

10. The method of claim 9, wherein the re-calibrated lockup control valve spring has a working load of 3 lb. 2 oz. and a compressed height of 0.400".

11. The method of claim 9, wherein a diameter of the re-calibrated pre-fill valve represents an area of a third differential area of the torque converter clutch control valve.

12. The method of claim 11, wherein the diameter of the pre-fill valve is equal to or less than 0.235".

\* \* \* \* \*